United States Patent

Fukukawa et al.

[11] 3,772,063
[45] Nov. 13, 1973

[54] PROCESS FOR THE PRODUCTION OF PRESSURE-SENSITIVE ADHESIVE MATERIALS

[75] Inventors: Sadaomi Fukukawa; Takefumi Shimomura; Ichiro Ijichi; Nobuharu Yoshikawa; Tomoyuki Murakami, all of Osaka, Japan

[73] Assignee: Nitto Electric Industrial Co., Ltd., Osaka, Japan

[22] Filed: July 9, 1971

[21] Appl. No.: 161,329

[30] Foreign Application Priority Data
July 9, 1970 Japan.................................. 45/60389

[52] U.S. Cl..... 117/93.31, 117/122 P, 117/161 UC, 204/159.15
[51] Int. Cl.......... B44d 1/50, C08f 1/24, C08f 3/64
[58] Field of Search ...................... 117/93.31, 122 P, 117/122 PA, 161 UC; 204/159.15

[56] References Cited
UNITED STATES PATENTS
3,661,618  5/1972  Brookman et al. .............. 117/93.31

OTHER PUBLICATIONS
Gould, Mechanism and Structure in Organic Chemistry, Holt, Rinehart and Winston New York, (1959), page 74

*Primary Examiner*—William D. Martin
*Assistant Examiner*—John H. Newsome
*Attorney*—Richard C. Sughrue et al.

[57] ABSTRACT

A pressure-sensitive tape is produced without the necessity of a crosslinking agent and a solvent by applying to a support a composition containing a polymerizable vinyl monomer represented by the general formula

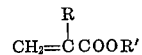

wherein R represents H or $CH_3$ and R' represents an alkyl group having less than 10 carbon atoms and irradiating the monomer layer with ionizing high energy rays to such an extent that the monomer is provided with a pressure-sensitive adhesivity (0.1 to 100 megarads).

5 Claims, No Drawings

PROCESS FOR THE PRODUCTION OF PRESSURE-SENSITIVE ADHESIVE MATERIALS

BACKGROUND OF THE INVENTION

1. Field of the Invention

The present invention relates to a process for producing a pressure-sensitive adhesive material by forming a pressure-sensitive adhesive layer on a support, and more particularly, it relates to a process for producing a pressure-sensitive adhesive material by applying a coating composition containing a polymerizable vinyl monomer and irradiating the monomer layer with ionizing radiation.

2. Description of the Prior Art

In the past, the process for producing pressure-sensitive adhesive tapes generally comprises preparing an adhesive composition by a. adding a tackifier, a crosslinking agent, etc., to a solution of a natural rubber or a synthetic rubber or b. dissolving a synthetic resin such as an acrylate copolymer and a vinyl ether copolymer in an organic solvent and then adding at least one of a softener, a plasticizer, a tackifier, a crosslinking agent, etc., applying the composition to a support such as a plastic film, a paper sheet, or a metallic sheet by a known manner such as a casting method or a roll coating method, followed by drying to evaporate off the solvent. The adhesive tape is then rolled up and cut into a desired width. However, in such conventional processes a large amount of solvent is required and thus a large amount of the solvent is released into the air during the production of the adhesive tapes to cause the problem of air pollution; in addition, the use of such a solvent is uneconomical since the solvent is used only as a means of dissolving the aforesaid rubber or synthetic resin, which results in greatly increasing the cost of production of the adhesive tapes.

Accordingly, it has been attempted to recover the solvent which is evaporated during the production of the adhesive tapes but since the solvent is recovered together with a part of the tackifier, softener, plasticizer, etc., as impurities, the solvent recovered cannot suitably be reused and thus the results are unsatisfactory.

Furthermore, the aforesaid conventional processes for producing pressure-sensitive adhesive tapes are accompanied with the following drawbacks; that is, in the process wherein natural rubber or synthetic rubber is employed, it takes time to cut into pieces and knead the rubber and also it takes a long period of time to dissolve the rubber kneaded in a solvent together with other additives; and in the process wherein the synthetic resin is employed, because a copolymer having suitable polymerization degree and polymerization distribution for pressure-sensitive adhesives is not readily available, it is required in the production of adhesive tapes to prepare beforehand a desired copolymer by subjecting a monomer to a polymerization method such as a solution polymerization method, an emulsion polymerization method or a suspension polymerization method.

Also, the characteristics of the adhesive for pressure-sensitive adhesive tapes are evaluated by the initial adhesive power of the adhesive and the cohesive force determining the durability of the adhesive power. For improving the aforesaid cohesive force of the adhesive, a conventional adhesive used for producing pressure-sensitive adhesive tapes contains a partial crosslinking agent such as polyisocyanate, polyamine and a sulfur compound but such a partial crosslinking agent is generally injurious, and the use of such a crosslinking agent is generally accompanied with the technical problem that if the cohesive force is too high, the initial adhesive power is reduced to lose the balance, and a highly difficult technique is required to control the extent of the partial crosslinkage.

Therefore, the present invention provides a simple process for producing pressure-sensitive adhesive materials without using a crosslinking agent or a solvent.

SUMMARY OF THE INVENTION

According to the process of this invention, a pressure-sensitive adhesive material is produced by coating or impregnating a support with a coating composition containing at least one of the monomers represented by the general formula

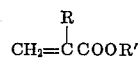

wherein R represents H or $CH_3$ and R' represents an alkyl group having less than 10 carbon atoms or containing at least one of the monomers mentioned above and at least one of the polymerizable vinyl monomers each having a polar group such as —COOH, —CN, —OOCR" (wherein R" represents an alkyl group), —$CONH_2$, and substituted —$CONH_2$ and then irradiating the monomer layer with ionizing radiation to such an extent that the monomer or monomers are provided with pressure-sensitive adhesive properties.

DESCRIPTION OF THE PREFERRED EMBODIMENTS

As is mentioned below in detail, the present invention provides an excellent pressure-sensitive adhesive layer without using an organic solvent and a chemical crosslinking agent by coating or impregnating a support with a composition containing a specific polymerizable monomer or polymerizable monomers which are liquids at normal temperature and then irradiating the monomer layer with ionizing radiation and thus the present invention has such industrial merits that the step of subjecting beforehand the monomer to chemical polymerization at the production of pressure-sensitive adhesive by a conventional manner, the step of dissolving the polymer in an organic solvent, and further the step of removing the solvent at the coating procedure of the coating composition can be omitted.

The polymerizable monomers used in this invention include acrylic acid alkyl esters and methacrylic acid alkyl esters and better results as pressure-sensitive adhesives are obtained when the esters have an alkyl moiety of less than 10 carbon atoms, such as when 2,2,4-trimethylpentyl ester, 2-ethylhexyl ester, n-butyl ester, isobutyl ester, n-propyl ester, isopropyl ester, ethyl ester, n-nonyl ester, n-decyl ester, and sec.-decyl ester are employed as the esters. Alkyl groups having various side chains may also be used. By irradiating the ester or the esters with ionizing high energy rays, the polymerization of the monomer or the monomers occurs together with the formation of partial crosslinkages and branched structure to provide good pressure-sensitive adhesive properties but by using the ester monomer or monomers together with other vinyl monomers having a polar group, better adhesive power to the surface of the support is obtained by the action of the polar group.

It is preferable that the amount of the vinyl monomer used be in a range of from 0.01 to 0.20 mole per mole of the ester monomer or monomers.

The vinyl monomer may be used in an amount of less than 0.01 mole per mole of the ester monomer but if the amount of the vinyl monomer is less than 0.01 mole, the advantageous effect of the vinyl monomer is insufficient. On the other hand, the vinyl monomer may be used in an amount of more than 0.20 mole, but in such a case, as the cohesive force increases, the viscosity and the adhesive power of the adhesives tend to be reduced to lose the balance as the pressure-sensitive adhesives.

Any combinations of the ester monomer and the vinyl monomer having the polar group may be employed in this invention. The vinyl monomer having a polar group may be, for example, shown by the following general formula

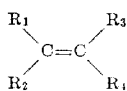

wherein $R_1$ represents —COOH, —CN,

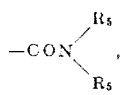

—$OOCR_7$, —$R_oCOOH$, —$R_oCN$,

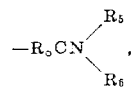

—$R_oOOCR_7$; $R_5$ and $R_6$ each represents H, an alkyl group having one to three carbon atoms, or a hydroxyalkyl group having one to three carbon atoms; $R_7$ represents a saturated or unsaturated alkyl group havng one to 18 carbon atoms; $R_o$ represents an alkylene group having one to three carbon atoms; $R_2$, $R_3$ and $R_4$ each represents H or the same group as $R_1$, as is mentioned above.

Typical and preferable examples of these vinyl monomers represented above are acrylic acid, methacrylic acid, itaconic acid, maleic acid, acrylonitrile, vinyl acetate, vinyl formate, vinyl butyrate, vinyl oleate, vinyl palmitate, acrylamide, and such acrylamide derivative as monomethylol acrylamide, dimethylol acrylamide, N-methyl acrylmaide, and N-ethyl acrylamide.

The composition containing the aforesaid polymerizable monomer or monomers is endowed with satisfactory pressure-sensitive adhesive properties by the irradiation of ionizing high energy rays but since the polymerizable monomer generally has a low viscosity, it is preferable to add to the composition a tackifier for increasing the viscosity of the coating composition for facilitating the coating procedure of the coating composition on a support and to provide a higher adhesive power to the coating composition. Moreover, other known additives such as a filler, a softener, a plasticizer, a pigment, and an age resistor may be added to the monomer composition in the proportions conventionally employed.

As the tackifier, there may be employed a polymerized terpene resin, a cumarone-indene resin, a phenol resin, rosin, and hydrogenated rosin in an amount of 5–50 percent by weight based on the weight of the polymerizable monomer or monomers.

If the amount of the tackifier is less than 5 percent, a sufficient effect by the addition thereof cannot be obtained, while if the amount thereof is higher than 50 percent, the cohesive force is reduced and the adhesive power is reduced.

As the support for the pressure-sensitive adhesive materials, any material conventionally employed, such as papers, cloths, non-woven fabrics, plastics, metallic sheets, etc., may be employed. The plastics are generally used as films, sheets, and porous sheets of soft polymers and also the metal may be used as the foils thereof having any desired thickness.

As the plastics, there are illustrated polyvinyl chloride, polyethylene, polypropylene, nylon, polyesters, polystyrene, polycarbonates, polyphenylene oxides, polyimides, polyvinyl fluoride, polyvinylidene fluoride, and the like. As the metals, there are illustrated aluminum, copper, and tin.

Thus, the support is uniformly coated is impregnated with a coating composition containing the aforesaid polymerizable monomer or monomers and without curing the composition thus coated, the monomer layer is irradiated with ionizing high energy rays in a semicured state to such an extent that the monomer layer is endowed with pressure-sensitive adhesive properties to conduct the polymerization and the formation of the partial crosslinkage and the branched structure, whereby a pressure-sensitive adhesive material or tape having a good balance of tackiness, adhesive power and cohesive force is obtained. It is believed that the formation of the partial crosslinked structure contributes to the improvement of the cohesive force and the formation of the branched structure contributes to the improvement of the adhesive power. In order to form the pressure-sensitive adhesive layer having a good balance in tackiness, adhesive power and cohesive force on the support as mentioned above, it is necessary to control the dosage of the irradiation of ionizing radiation in accordance with the kinds of the polymerizable monomer or monomers, the kinds of other additives, and the thickness of the monomer layer on the support.

In order to obtain the above objects of this invention, the dosage of the ionizing radiation is generally in a range of from 0.1 to 100 megards but from the viewpoint of the balance mentioned above, irradiation of ionizing radiation in a dosage of from 0.5 to 50 megarads is preferable. If the dosage is less than 0.1 megarad, the polymerization of the polymerizable monomer or monomers is insufficient as well as the formation of the partial crosslinkage and the branched structure are extremely insufficint to make it difficult to obtain satisfactory characteristics as a pressure-sensitive adhesive. On the other hand, if the dosage is higher than 100 megarads, the monomer layer tends to be hardened and to lose its tackiness and hence such a high dosage is generally unsuitable.

As the source for the ionizing radiation, high energy electron beams from an electron accelerator are desirable in such points that a high dosage is readily obtained and the rate of the processing can be greatly increased; but other high energy radiation such as gamma rays, X-rays, and beta rays may be used.

According to the process of this invention, a partial cross-linking structure to an extent of increasing the cohesive force can be formed without the necessity of complicated steps of dissolving rubbers or copolymers in organic solvents and recovering the evaporated solvents as in conventional methods and also without the necessity of employing an injurious crosslinking agent. Also, according to the process of this invention, it is unnecessary to evaporate an organic solvent and hence at the case of irradiating the layer of the polymerizable monomer or monomers formed on the support with ionizing high energy rays, no foaming phenomenon occurs and a uniform pressure-sensitive adhesive layer is formed regardless of the thickness of the monomer layer. Furthermore, even in the case of using a low-adhesive support such as a polyethylene film, a polypropylene film, an aluminum sheet, etc., a high adhesive power is obtained between the pressure-sensitive adhesive layer and the support without the necessity of the application of an undercoat to the support as in conventional methods. This is believed to be caused by such phenomenon that a keying force is formed at the same time when the polymerizable monomer or monomers are polymerized by the irradiation of the ionizing radiation.

The invention will be further explained by reference to the following non-limiting examples, in which "parts" indicates "parts by weight."

EXAMPLE 1

A uniform blend of 100 parts of butyl acrylate and 10 parts of acrylic acid as polymerizable monomers was applied in a thickness of 50 microns to an aluminum foil of 100 microns in thickness by means of a coating roll and then the monomer layer thus formed was irradiated with electron beams by means of an insulating iron core transformer-type accelerator under the following conditions:

| | |
|---|---|
| Voltage | 300 KV |
| Current | 25 m. amp. |
| Distance between the source and the aluminum foil | 10 cm. |
| Linear velocity | 8 m./min. |
| Passed number | once |
| Total dose | 5 megarads |

By the irradiation of the electron beams as mentioned above, the monomers were polymerized to form a transparent pressure-sensitive adhesive layer on an aluminum foil.

When the pressure-sensitive adhesive foil thus obtained was applied to a stainless steel sheet and the adhesive foil was peeled at a peeling angle of 180° C, a pulling speed of 300 mm./min., and at a temperature of 20°C., it was confirmed that the adhesive power was 1,500 g./20 mm. in width and the cohesive force was 10 hours, whereas when a pressure-sensitive adhesive tape prepared by a conventional method was tested by the same manner as above, the adhesive power was 1,200 g./20 mm. in width and the cohesive force was 8.0 hours.

In this experiment, the cohesive force was evaluated as follows; that is, the pressure-sensitive adhesive foil was applied to a bakelite plate, a static load was applied to the adhesive foil in parallel with the surface of the plate at a constant temperature, and the period of time unitl the pressure-sensitive adhesive layer was broken by cohesion was measured. In this example, the area of the adhesive foil applied was 2 cm x 1 cm. and the weight of the static load was 2 kg. The temperature of measurement was 20°C.

In addition, the conventional pressure-sensitive adhesive tape used above for the purpose of comparison was prepared as follows:

That is, 100 parts of a copolymer prepared by chemically copolymerizing the polymerizable monomers used above in the presence of a polymerization catalyst, 5 parts of toluene-di-isocyanate as a crosslinking agent for increasing the cohesive force, and 10 parts of a xylene resin as a tackifier for increasing the tackiness were dissolved in an organic solvent and the liquid composition was directly applied to an aluminum foil by an ordinary manner followed by drying.

Then, the polymerizable monomers mentioned above were applied in a thickness of 50 microns on an aluminum foil of 100 microns in thickness and then the monomer layer was irradiated with electron beams in a dosage range of from 0.1 to 100 megarads by varying the voltage, current and line speed to provide various pressure-sensitive adhesive foils or tapes, the characteristics of which are shown in Table 1.

TABLE 1

| Dosage (megarad) | Adhesive power (g./20 mm width) | Cohesive force (hour) |
|---|---|---|
| 0.1 | 900 | <0.5 |
| 0.5 | 1300 | <0.5 |
| 1 | 1350 | 5.0 |
| 3 | 1450 | 10 |
| 5 | 1500 | 10 |
| 7 | 1730 | 15 |
| 10 | 1550 | 15 |
| 20 | 1240 | 16 |
| 30 | 1270 | 16 |
| 50 | 1120 | 18 |
| 70 | 950 | 17 |
| 100 | 470 | 16 |

In the above table, the adhesive power and the cohesive force were measured under the aforesaid conditions.

EXAMPLE 2

Various kinds of pressure-sensitive adhesive tapes were prepared by applying the same kinds of polymerizable monomers as in Example 1 to various supports such as plastic films, a cellophane film, a paper sheet, etc., followed by the irradiation of electron beams and the properties thereof were then measured.

Thus, the coating composition of the polymerizable monomers as in Example 1 was applied in a thickness of 50 microns to each of the various supports as shown in Table 2 and then the monomer layer thus formed was irradiated with electron beams under the following conditions.

| | |
|---|---|
| Voltage | 300 KV. |
| Current | 25 m. amp. |
| Distance between the source and the support | 10 cm. |
| Linear velocity | 8 m./min. |
| Passed number | once |
| Total dose | 5 megarads |

The adhesive powers of the pressure-sensitive adhesive sheets obtained above to a stainless steel plate at 20°C. are shown in Table 2.

TABLE 2

| Support | | Adhesive power (g./20 mm. width) |
|---|---|---|
| Kind | Thickness ($\mu$) | |
| Aluminum foil | 100 | 1500 |

| | | |
|---|---|---|
| Polyvinyl chloride | 50 | 1110 |
| Polyethylene | 50 | 1050 |
| Polypropylene | 75 | 980 |
| Nylon | 50 | 920 |
| Polyester | 50 | 1250 |
| Polystyrene | 50 | 1120 |
| Cellophane | 50 | 720 |
| Glassine paper | 50 | 970 |
| Non-woven fabric(Rayon) impregnated | | 950 |
| Japanese paper impregnated | | 980 |

In the above experiments, in case of using the non-woven fabric and the Japanese paper as the supports for the pressure-sensitive adhesive sheets, each support was impregnated with the coating composition and the sheet was irradiated with the electron beams in that condition, and thus, adhesive sheets having two adhesive surfaces were prepared.

As is clear from the results shown in Table 2, pressure-sensitive adhesive materials having good adhesive powers were obtained in every case and in particular it is interesting that the keying power between the support and the pressure-sensitive adhesive layer formed by the irradiation of the electron beams was too strong to need any specific surface treatment for the support. This fact shows that in case of using a polyethylene film, a polypropylene film, or an aluminum foil, each having poor surface property for adhesion, a pressure-sensitive adhesive material having the pressure-sensitive adhesive layer strongly bonded on the support is obtained without the necessity of a specific adhesive treatment such as corona discharging treatment or a flame treatment.

Also, the keying powers between the support and the pressure-sensitive adhesive layer in the case of this invention shown in Table 2 and in the case of the conventional pressure-sensitive adhesive tape as shown in Example 1 were measured and the results are shown in Table 3. The keying power was measured as follows: The pressure-sensitive adhesive tape was applied to a bakelite plate in a width of 20 mm. and then the keying power was measured by peeling the tape at a peeling angle of 180°C., a pulling speed of 500 mm./min. and a temperature of 20°C. In this case, when the adhesive tape was peeled at the boundary between the support and the adhesive layer, the peeling resistance was evaluated as the keying power. When the adhesive tape was peeled at the boundary between the bakelite plate and the adhesive layer, the keying power was evaluated to be higher than the peeling resistance.

TABLE 3

| Support | | Keying power (g/20mm.width) | |
|---|---|---|---|
| Kind | Thickness($\mu$) | Invention process | Conventional process |
| Polyethylene | 50 | >1350 | 380 |
| Polypropylene | 75 | >1100 | 220 |
| Aluminum foil | 100 | >1850 | 1150 |
| Cellophane | 50 | >1100 | 950 |

As shown in the above tabel the pressure-sensitive adhesive materials prepared by the process of this invention had strong keying powers and hence it will be understood that when the adhesive tape prepared by the process of this invention is unrolled, the back surface of the adhesive tape will not be stained by local sticking of the adhesive layer and also when the adhesive tape by the process of this invention is applied to an article and then peeled from the article, the surface of the article will not be stained by the adhesive layer remaining. The exact reasons why such excellent characteristics are obtained have not yet been clarified but it is believed to be caused by the fact that, when forming the pressure-sensitive adhesive layer by irradiating the polymerizable monomers on the support with ionizing radiation, a part of the polymerizable monomers causes a graft polymerization between them and the support by the influence of the ionizing radiation.

EXAMPLES 3-6

In these examples various pressure-sensitive adhesive sheets were prepared by applying each of the coating compositions shown below to an aluminum foil of 100 microns in thickness and irradiating the monomer layer with the ionizing radiation.

Polymerizable monomer composition:
Example 3: Iso-octyl acrylate alone.
Example 4: A blend consisting of 100 parts of butyl acrylate, 4 parts of acrylamide, and 15 parts of vinyl acetate.
Example 5: A blend consisting of 100 parts of acrylic acid-2-ethylhexyl, and 15 parts of acrylamide.
Example 6: A blend consisting of 100 parts of ethyl methacrylate, 5 parts of methacrylic acid, and 25 parts of a tackifier.

The tackifier used above was Nikanol H (trade name of a xylene resin made by NIHON GASU KAGAKU CO., LTD. in Japan.

The aforesaid compositions were applied to the aluminum foil in a thickness of 50 microns and the layers were irradiated with ionizing radiation, the properties of which are shown in the following table.

TABLE 4

| | Ex. 3 | Ex. 4 | Ex. 5 | Ex. 6 |
|---|---|---|---|---|
| Dose (megarad) | 4 | 7 | 5 | 35 |
| Adhesive power (g./20 mm. width) | 950 | 1550 | 1800 | 1450 |
| Cohesive force (hr.) | 2.0 | 5.5 | 11 | 18 |
| Keying power (g./20 mm.width) | >1100 | >1700 | >1930 | >1750 |

In the above table, the adhesive power, the cohesive force and the keying power were measured according to the procedures described in Example 1 and Example 2.

The results in Example 3 show that a pressure-sensitive adhesive layer can be formed by using iso-octyl acrylate alone without adding a vinyl monomer having a polar group. It is believed to be caused by the formation of the branched structure and the partial crosslinkage by the irradiation of the ionizing radiation that the adhesive power and the cohesive force suitable for practical purposes are obtained by using the acrylic acid ester alone.

By the results of Example 6, in which a tackifier was added to the polymerizable monomers, it has been confirmed that the addition of the tackifier contributes to the increase in adhesive power and cohesive force but gives no bad influences on the formation of the pressure-sensitive adhesive layer by irradiating the polymerizable monomers with ionizing radiation.

We claim:
1. A process for the production of a pressure-sensitive adhesive material which comprises coating or impregnating a support with a composition containing at least one monomer represented by the following formula

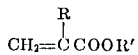

wherein R represents H or $CH_3$ and R' represents an alkyl group having less than 10 carbon atoms and at least one polymerizable vinyl monomer having a polar group selected from the group consisting of acrylic acid, methacrylic acid, itaconic acid, and maleic acid and irradiating the monomer with 0.1 to 100 megarads of ionizing radiation to provide pressure-sensitive adhesivity to said monomer.

2. The process as claimed in claim 1 wherein the proportion of the polymerizable vinyl monomer having the polar group is less than 0.20 mole per mole of the monomer represented by said formula.

3. The process as claimed in claim 1 wherein the proportion of the polymerizable vinyl monomer having the polar group is from 0.01 to 0.20 mole per mole of the monomer represented by said formula.

4. The process as claimed in claim 1 wherein said monomer represented by said formula is butyl acrylate, iso-octyl acrylate, acrylic acid-2-ethylhexyl, or ethyl methacrylate.

5. The process as claimed in claim 1 wherein the dosage of the ionizing radiation is from 0.5 to 50 megarads.

* * * * *